United States Patent
Chyan et al.

(10) Patent No.: US 9,898,302 B2
(45) Date of Patent: Feb. 20, 2018

(54) CONTROL DEVICE AND ACCESS SYSTEM UTILIZING THE SAME

(71) Applicant: Silicon Motion, Inc., Jhubei, Hsinchu County (TW)

(72) Inventors: Yu-Wei Chyan, Hsinchu (TW); Jiyun-Wei Lin, Xinpu Township, Hsinchu County (TW)

(73) Assignee: SILICON MOTION, INC., Jhubei, Hsinchu County (TW)

(*) Notice: Subject to any disclaimer, the term of this patent is extended or adjusted under 35 U.S.C. 154(b) by 428 days.

(21) Appl. No.: 14/195,089

(22) Filed: Mar. 3, 2014

(65) Prior Publication Data
US 2014/0380026 A1 Dec. 25, 2014

Related U.S. Application Data

(60) Provisional application No. 61/837,525, filed on Jun. 20, 2013.

(30) Foreign Application Priority Data

Nov. 11, 2013 (TW) .............................. 102140822 A

(51) Int. Cl.
*G06F 9/38* (2006.01)
*G06F 13/16* (2006.01)

(52) U.S. Cl.
CPC .......... *G06F 9/3881* (2013.01); *G06F 9/3824* (2013.01); *G06F 13/1673* (2013.01); *G06F 13/1694* (2013.01)

(58) Field of Classification Search
CPC ............. G06F 13/1657; G06F 13/1668; G06F 13/1673; G06F 13/1694; G06F 9/3881; G06F 9/3824
See application file for complete search history.

(56) References Cited

U.S. PATENT DOCUMENTS

6,456,517 B2 * 9/2002 Kim et al. ............. G11C 16/06
365/51
8,310,880 B2 11/2012 Kuehne et al.
(Continued)

FOREIGN PATENT DOCUMENTS

| EP | 0 915 424 | 5/1999 |
|---|---|---|
| KR | 1020060116729 A | 11/2006 |
| TW | 201133239 A1 | 10/2011 |

OTHER PUBLICATIONS

PCT International Search Report dated Sep. 1, 2014.
(Continued)

*Primary Examiner* — Benjamin Geib
(74) *Attorney, Agent, or Firm* — McClure, Qualey & Rodack, LLP

(57) ABSTRACT

A control device coupled between a first memory and a second memory and including an execution unit, a first storage unit, a second storage unit, a selection unit and a processing unit is disclosed. The execution unit executes a specific instruction set to access the first and the second memories. The first storage unit is configured to store a first instruction set. The second storage unit is configured to store a second instruction set. The selection unit outputs one of the first and the second instruction sets to serve as the specific instruction set according to a control signal. The processing unit generates the control signal according to an execution state of the execution unit.

19 Claims, 2 Drawing Sheets

(56) References Cited

U.S. PATENT DOCUMENTS

| | | | |
|---|---|---|---|
| 8,677,054 B1* | 3/2014 | Meir | G06F 12/0246 707/817 |
| 2006/0259662 A1 | 11/2006 | Furukawa et al. | |
| 2008/0281999 A1 | 11/2008 | Kang et al. | |
| 2011/0264851 A1 | 10/2011 | Jeon et al. | |
| 2012/0155173 A1 | 9/2012 | Lee et al. | |
| 2013/0254454 A1* | 9/2013 | Ide | G06F 3/0611 711/5 |
| 2014/0351456 A1* | 11/2014 | Sharifie | G06F 3/0613 710/5 |

OTHER PUBLICATIONS

Korean language office action dated Jun. 20, 2017, issued in application No. KR 10-2015-7035180.
English language translation of Korean Office Action.

* cited by examiner

CONTROL DEVICE AND ACCESS SYSTEM UTILIZING THE SAME

CROSS REFERENCE TO RELATED APPLICATIONS

This application claims the benefit of U.S. Provisional Application No. 61/837,525 filed on Jun. 20, 2013, which application is hereby incorporated by reference in its entirety.

This Application claims priority of Taiwan Patent Application No. 102140822, filed on Nov. 11, 2013, the entirety of which is incorporated by reference herein.

BACKGROUND OF THE INVENTION

Field of the Invention

The invention relates to a control device, and more particularly to a control device that executes an accessing operation between two memories.

Description of the Related Art

Generally, storage mediums comprise volatile memories and non-volatile memories. Volatile memory is memory wherein data stored thereto is erased when power provided to the memory is interrupted. Conversely, non-volatile memory is memory wherein data stored thereto is not erased when power provided to the memory is interrupted.

The non-volatile memories comprise read-only memories (ROMs), programmable read-only memories (PROMs), erasable programmable read-only memories (EPROMs), electrically erasable programmable read-only memories (EEPROMs), and flash memories. Additionally, the volatile memories comprise random access memories (RAMs), dynamic random access memories (DRAMs) and static random access memories (SRAMs).

BRIEF SUMMARY OF THE INVENTION

In accordance with an embodiment, a control device is coupled between a first memory and a second memory and comprises an execution unit, a first storage unit, a second storage unit, a selection unit and a processing unit. The execution unit executes a specific instruction set to access the first and the second memories. The first storage unit is configured to store a first instruction set. The second storage unit is configured to store a second instruction set. The selection unit outputs the first or the second instruction set to serve as the specific instruction set according to a control signal. The processing unit generates the control signal according to an execution state of the execution unit.

In accordance with another embodiment, an access system comprises a first memory, a second memory and a control device. The control is coupled between the first and the second memories and comprises an execution unit, a first storage unit, a second storage unit, a selection unit and a processing unit. The execution unit executes a specific instruction set to access the first and the second memories. The first storage unit is configured to store a first instruction set. The second storage unit is configured to store a second instruction set. The selection unit outputs one of the first and the second instruction sets to serve as the specific instruction set according to a control signal. The processing unit generates the control signal according to an execution state of the execution unit.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

Figure 1:
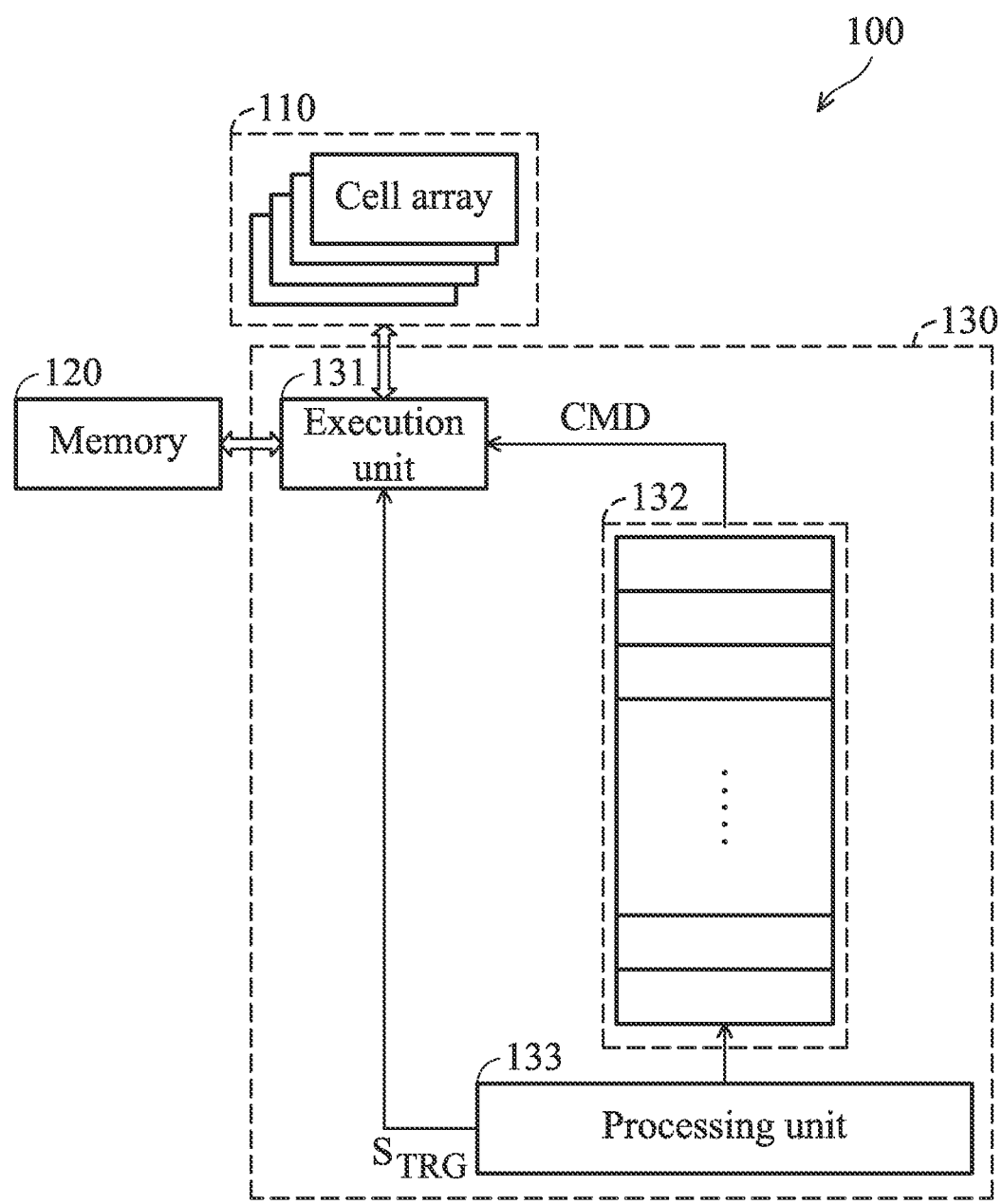
FIGS. 1 and 2 are schematic diagrams of exemplary embodiments of an access system, in accordance with some embodiments.

FIG. 1 is a schematic diagram of an exemplary embodiment of an access system, in accordance with some embodiments. The access system 100 comprises memories 110, 120 and a control device 130. The control device 130 is coupled between the memories 110 and 120 to transmit data between the memories 110 and 120. In this embodiment, the memory 110 comprises various cells. The cells are arranged to a matrix.

The invention does not limit the types of memories 110 and 120. In one embodiment, the type of memory 110 is the same as or different from the type of memory 120. In another embodiment, the control device 130 and the memory 120 are integrated into a memory device. Therefore, the memory 110 is referred to as an external memory and the memory 120 is referred to an internal memory for the control device 130. In other embodiments, the memory 110 accesses the memory 120 via the control device 130. Similarly, the memory 120 is capable of accessing the memory 110 via the control device 130.

In this embodiment, the control device 130 comprises an execution unit 131, a storage unit 132 and a processing unit 133. The execution unit 131 executes an instruction set CMD stored in the storage unit 132 to access the memories 110 and 120. In one embodiment, the storage unit 132 is constituted by various registers to store various write instructions and read instructions.

In one embodiment, the processing unit 133 is a central processing unit (CPU) used to execute software to generate an execution result and then write a corresponding instruction set to the storage unit 132 according to the execution result. In another embodiment, the processing unit 133 sends a trigger signal $S_{TRG}$ to trigger the execution unit 131. Therefore, the execution unit 131 executes the instruction set CMD.

In some embodiments, when the execution unit 131 reads the instruction set CMD stored in the storage unit 132, the processing unit 133 cannot write a new instruction set to the storage unit 132. After the processing unit 133 completes the instruction set CMD, the processing unit 133 first writes a new instruction set to the storage unit 132 and then the execution unit 131 reads and executes the new instruction set stored in the storage unit 132. Therefore, the accessing time of the access system 100 is longer. To reduce the access time, FIG. 2 is a schematic diagram of another exemplary embodiment of an access system, in accordance with some embodiments.

Figure 2:
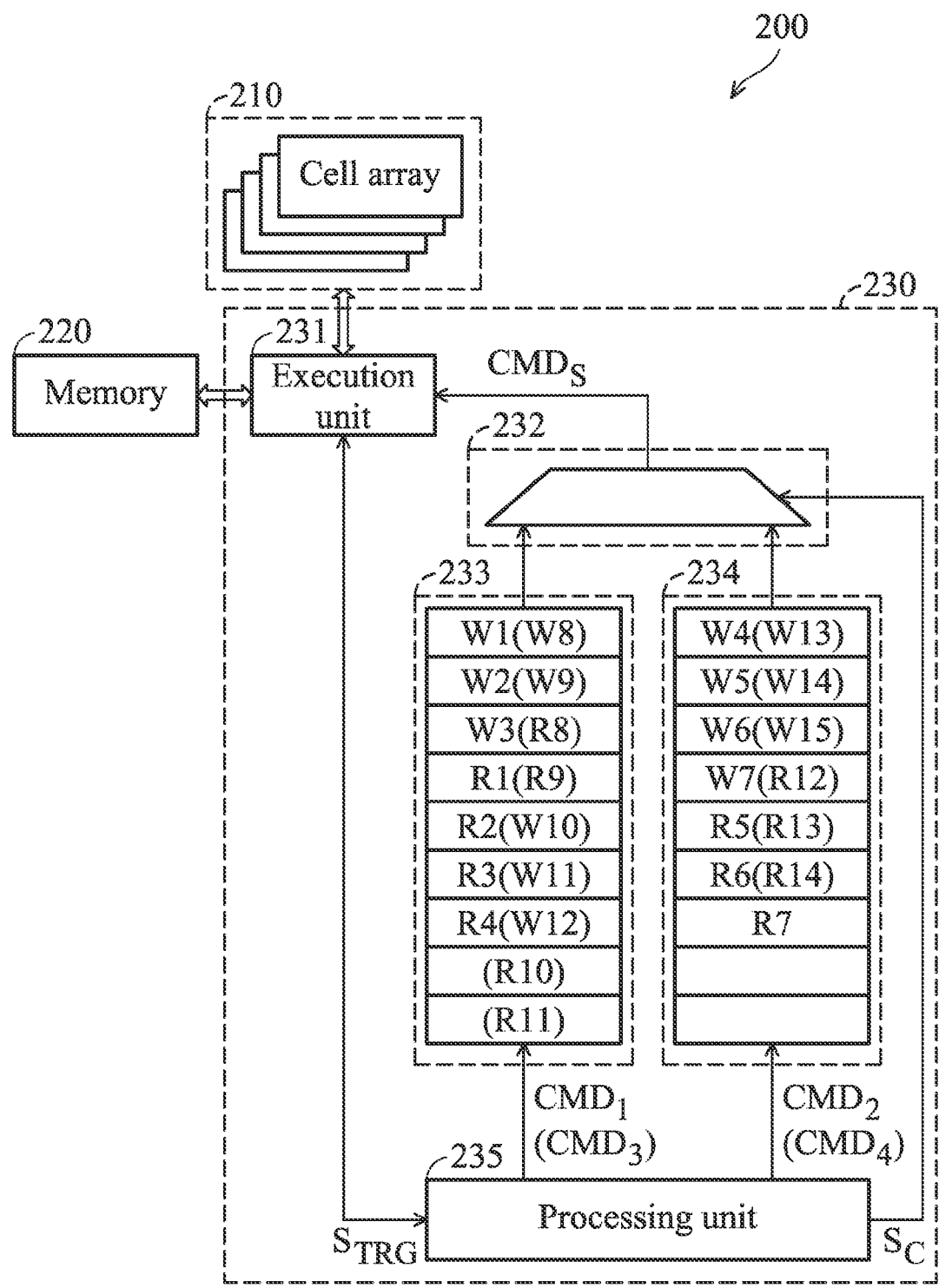

As shown in FIG. 2, the access system 200 comprises memories 210, 220 and a control device 230. The control device 230 is coupled between the memories 210 and 220 to transmit data between the memories 210 and 220. The invention does not limit the kinds of the memories 210 and 220. In one embodiment, the kind of the memory 210 is the same as or different from the kind of the memory 220.

For example, the memory 210 comprises various cells. The cells are arranged into a matrix. In some embodiments, the memory 210 is a NAND flash memory, such as a double data rate (DDR) NAND flash memory. In other embodiments, the memory 220 is a static random-access memory (SRAM).

In this embodiment, the control device 230 comprises an execution unit 231, a selection unit 232, storage units 233, 234 and a processing unit 235. The execution unit 231 executes a specific instruction set $CMD_S$ to access the memories 210 and 220. The invention does not limit the circuit structure of the execution unit 231. Any circuit can serve as the execution unit 231, as long as the circuit is capable of accessing memory.

Furthermore, when the memory 210 is a DDR memory, the execution unit 231 is required to comprise a DDR interface to access the memory 210. In other embodiments, the execution unit 231 further comprises a direct memory access (DMA) unit to access the memory 220.

The selection unit 232 outputs the instruction set $CMD_1$ or $CMD_2$ to serve as the specific instruction set $CMD_S$ according to a control signal $S_C$. The execution unit 231 receives the specific instruction set $CMD_S$. The invention does not limit the circuit structure of the selection unit 232. Any circuit can serve as the selection unit 232, as long as the circuit is capable of outputting signal selectively. In one embodiment, the selection unit 232 is a multiplexer (MUX).

The storage unit 233 is configured to store the instruction set $CMD_1$, and the storage unit 234 is configured to store the instruction set $CMD_2$. In this embodiment, each storage unit comprises various registers to store various write instructions and various read instructions. The invention does not limit the number of registers in the storage unit. In this embodiment, the number of registers in the storage unit 233 is the same as the number of registers in the storage unit 234. In another embodiment, the number of registers in the storage unit 233 is different from the number of the registers of the storage unit 234.

For clarity, the instruction set $CMD_1$ comprises write instructions W1~W3 and read instructions R1~R4, and the instruction set $CMD_2$ comprises write instructions W4~W7 and read instructions R5~R7, but the disclosure is not limited thereto. In some embodiments, each of the instruction sets $CMD_1$ and $CMD_2$ comprises other number of instructions.

The processing unit 235 generates the control signal SC according to an execution state of the execution unit 231. The selection unit 232 outputs the instruction set CMD1 or CMD2 to the execution unit 231 according to the control signal SC. Assuming that the selection unit 232 first outputs the instruction set CMD1 to the execution unit 231. The execution unit 231 sequentially executes the write instructions W1~W3 and the read instructions R1~R4.

The execution unit 231 executes the instruction set $CMD_1$ and simultaneously the processing unit 235 writes the instruction set $CMD_2$ to the storage unit 234. When the execution unit 231 completes the instruction set $CMD_1$, the processing unit 235 sends the control signal $S_C$. The selection unit 232 outputs the instruction set $CMD_2$ to the execution unit 231 according to the control signal $S_C$.

In one embodiment, the processing unit 235 sends a trigger signal $S_{TRG}$ to activate the execution unit 231 to execute the instruction set $CMD_2$. The execution unit 231 executes the instruction set $CMD_2$ and simultaneously the processing unit 235 writes an instruction set $CMD_3$ to the storage unit 233. As shown in FIG. 2, the instruction set $CMD_3$ comprises write instructions W8~W12 and read instructions R8~R11. When the execution unit 231 completes the instruction set $CMD_2$, the processing unit 235 sends the control signal $S_C$. The selection unit 232 outputs the instruction set $CMD_3$ to serve as the specific instruction set $CMD_S$ according to the control signal $S_C$. The execution unit 231 executes the instruction set $CMD_3$.

The execution unit 231 executes the instruction set $CMD_3$ and simultaneously the processing unit 235 writes an instruction set $CMD_4$ to the storage unit 234. As shown in FIG. 2, the instruction set $CMD_4$ comprises write instructions W13~W15 and read instructions R12~R14. When the execution unit 231 completes the instruction set $CMD_3$, the processing unit 235 sends the control signal $S_C$. The selection unit 232 outputs the instruction set $CMD_4$ to serve as the specific instruction set $CMD_S$ according to the control signal $S_C$. The execution unit 231 executes the instruction set $CMD_4$.

Since the execution unit 231 executes a multitude of instruction sets sequentially and does not wait for the processing unit 235, which writes the instruction set to the storage unit 233 or 234, the access time of the access system 200 is reduced. Additionally, the invention does not limit the number of storage units. In other embodiments, the number of storage units is greater than 3.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control device coupled between a first memory and a second memory, comprising:
   an execution unit executing a specific instruction set to transmit data between the first and the second memories;
   a first storage unit configured to store a first instruction set;
   a second storage unit configured to store a second instruction set;
   a selection unit outputting the first or the second instruction set to serve as the specific instruction set according to a control signal; and
   a processing unit generating the control signal when the execution unit completes the specific instruction set, wherein the processing unit writes the first instruction set to the first storage unit and writes the second instruction set to the second storage unit, wherein the first memory is an NAND flash memory, and the second memory is an static random-access memory (SRAM), wherein the second memory and the control device are integrated into a memory device, and the first memory is disposed outside of the memory device.

2. The control device as claimed in claim 1, wherein the processing unit stores the first instruction set in the first storage unit and stores the second instruction set in the second storage unit.

3. The control device as claimed in claim 2, wherein when the first instruction set is served as the specific instruction set and then the execution unit executes the specific instruction set, and the execution unit executes the specific instruction set, meanwhile, the processing unit stores the second instruction set in the second storage unit.

4. The control device as claimed in claim 1, wherein the first storage unit comprises a plurality of registers to store a plurality of instructions, and the instructions constitute the first instruction set.

5. The control device as claimed in claim 1, wherein the first memory is an NAND flash memory.

6. The control device as claimed in claim 5, wherein the first memory is a double data rate (DDR) NAND flash memory.

7. The control device as claimed in claim 1, wherein the second memory is a static random-access memory (SRAM).

8. The control device as claimed in claim 1, wherein the selection unit is a multiplexer (MUX).

9. The control device as claimed in claim 1, wherein the execution unit comprises a direct memory access (DMA) unit to access the second memory.

10. An access system comprising:
a first memory;
a second memory; and
a control device coupled between the first and the second memories and comprising:
an execution unit executing a specific instruction set to transmit data between the first and the second memories;
a first storage unit configured to store a first instruction set;
a second storage unit configured to store a second instruction set;
a selection unit outputting the first or the second instruction set to serve as the specific instruction set according to a control signal; and
a processing unit generating the control signal when the execution unit completes the specific instruction, wherein the processing unit writes the first instruction set to the first storage unit and writes the second instruction set to the second storage unit, wherein the first memory is an NAND flash memory, and the second memory is a static random-access memory (SRAM), wherein the second memory and the control device are integrated into a memory device, and the first memory is disposed outside of the memory device.

11. The access system as claimed in claim 10, wherein the control device and the second memory are integrated into a memory device.

12. The access system as claimed in claim 10, wherein the processing unit stores the first instruction set in the first storage unit and stores the second instruction set in the second storage unit.

13. The access system as claimed in claim 12, wherein when the first instruction set serves as the specific instruction set and then the execution unit executes the specific instruction set, and the execution unit executes the specific instruction set, meanwhile, the processing unit stores the second instruction set in the second storage unit.

14. The access system as claimed in claim 10, wherein the first storage unit comprises a plurality of registers to store a plurality of instructions, and the instructions constitute the first instruction set.

15. The access system as claimed in claim 10, wherein the first memory is an NAND flash memory.

16. The access system as claimed in claim 15, wherein the first memory is a double data rate (DDR) NAND flash memory.

17. The access system as claimed in claim 10, wherein the second memory is a static random-access memory (SRAM).

18. The access system as claimed in claim 10, wherein the selection unit is a multiplexer (MUX).

19. The access system as claimed in claim 10, wherein the execution unit comprises a direct memory access (DMA) unit to access the second memory.

* * * * *